April 5, 1949.  J. H. BOICEY  2,466,078

METHOD FOR LAMINATING COMPOSITE SAFETY GLASS

Filed Dec. 2, 1944  2 Sheets-Sheet 1

Inventor
JAMES H. BOICEY
By Frank Fraser
Attorney

April 5, 1949.   J. H. BOICEY   2,466,078
METHOD FOR LAMINATING COMPOSITE SAFETY GLASS
Filed Dec. 2, 1944   2 Sheets-Sheet 2
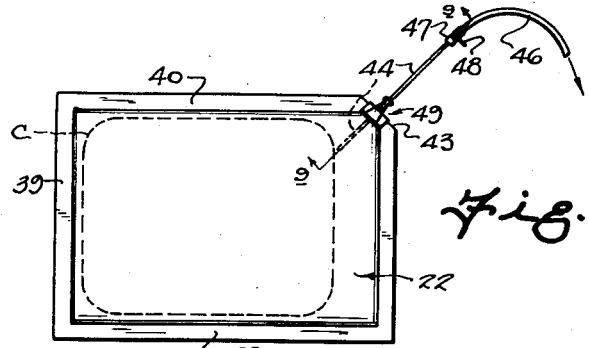
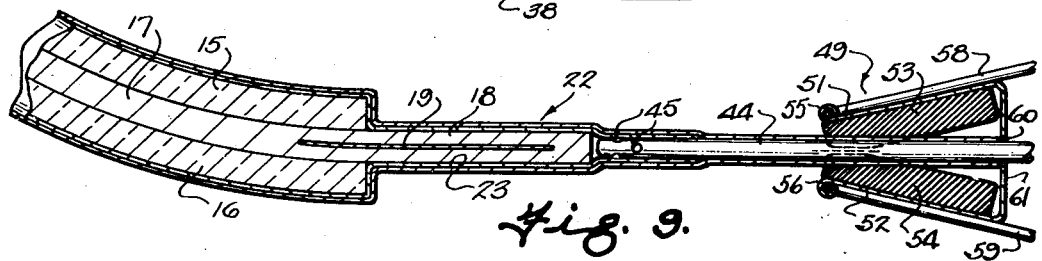
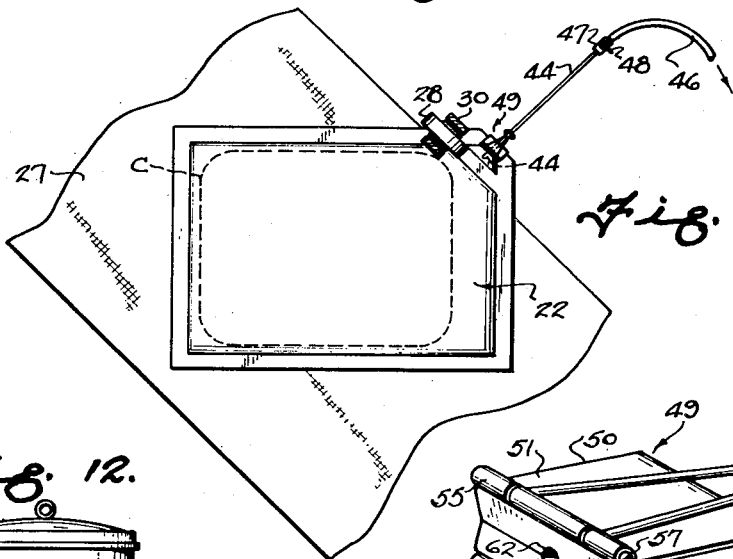
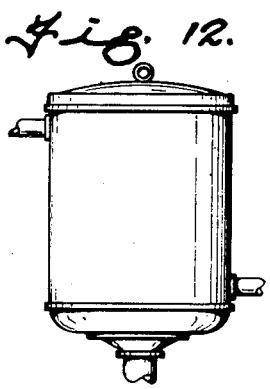
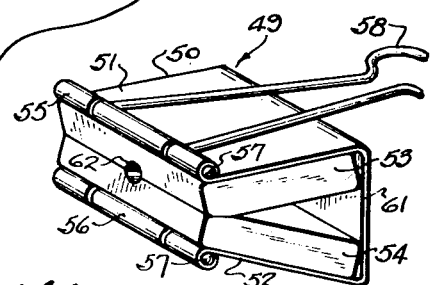
Inventor
JAMES H. BOICEY.
By Frank Fraser
Attorney Patented Apr. 5, 1949

2,466,078

UNITED STATES PATENT OFFICE 2,466,078

METHOD FOR LAMINATING COMPOSITE SAFETY GLASS

James H. Boicey, Toledo, Ohio, assignor to Libbey-Owens-Ford Glass Company, Toledo, Ohio, a corporation of Ohio Application December 2, 1944, Serial No. 566,337

1 Claim. (Cl. 154—2.81)

The present invention relates to the manufacture of laminated safety glass generally, but is of particular advantage in conection with the making of special or unusual types of such glass.

Generally speaking, all laminated safety glass is made up of two or more sheets of glass with one or more interposed layers of non-brittle plastic, the whole being bonded together into a composite unit. This invention has to do with the actual bonding or laminating operation and is especially concerned with protecting the assembled glass and plastic sandwiches from direct contact with the fluid in an autoclave, into which they are introduced for permanent welding together under heat and pressure.

The best known type of laminated safety glass is that commonly used in automobiles, and which usually consists of two outer sheets of flat glass, and a relatively thin inner layer of plastic of the same area as the glass sheets. When these laminations are assembled into a sandwich the opposite faces of the plastic are completely covered by the glass, and it is a relatively simple matter to close up such a sandwich by a light preliminary pressure, between rolls, or in a platen press, to an extent sufficient to prevent ingress of the autoclave fluid between the glass and plastic layers. These particular prepressed sandwiches can then be placed in an autoclave and exposed directly to the action of heated fluid under pressure without any protective covering of any kind.

However, the pressing fluid ordinarily used for laminating glass is a petroleum type oil, and pressures of around 225 pounds per square inch, with temperatures of about 260 degrees Fahrenheit, maintained for 15-minute periods, are commonly employed to provide the heat and pressure necessary to permanently unite the laminations together. For this reason there are some types of glass-plastic sandwiches that cannot be treated in the direct and relatively simple manner outlined above.

Chief among these are the so-called extended plastic type units, now widely used in the glazing of aircraft. These units are quite similar to regular laminated glass, except for the fact that they have comparatively thick plastic interlayers which are of greater area than the glass sheets and extend outwardly therebeyond to provide a flexible attaching and sealing flange around the unit.

Now when a glass and plastic sandwich of this sort is placed unprotected in the autoclave, the action of the hot oil under pressure on the projecting flange will result in serious loss of plasticizer therefrom, together with wrinkling and distortion, if not actual disintegration of the exposed plastic.

In the case of bent glass laminations too, and particularly those with bends in two directions, unsatisfactory results may be obtained when the bent glass-plastic sandwiches are exposed directly to the fluid in the autoclave, because it is difficult to properly close these sandwiches by preliminary mechanical pressure to an extent that will prevent the heated autoclave fluid from being forced between the laminations when it is placed under pressure.

It is a primary aim of this invention to provide glass-plastic sandwiches with a maximum of protection from direct contact with a heated fluid under pressure, to which they are subjected in an autoclave, while at the same time offering a minimum of interference with, or modification of, the heating and pressing action exerted by the fluid on the sandwich.

Another object is the provision of a special type of protective envelope or container for the assembled laminations.

A further object is to provide a novel way of evacuating the air from the container after the glass-plastic sandwich has been placed therein.

Another object is the provision of an improved method of closing or sealing such a container to render it impervious to the autoclave fluid.

Still another object is to provide special evacuating, clamping and sealing equipment for carrying out the above aims.

Other objects and advantages of the invention will become more apparent during the course of the following description, when taken in connection with the accompanying drawings.

In the drawings, wherein like numerals are employed to designate like parts throughout the same:

Fig. 8 is a plan view of the container of Fig. 7, showing the air exhausting means in place;

Fig. 9 is a sectional view taken on the line 9—9 of Fig. 8;

Fig. 10 is a perspective view of the clamp associated with the air exhausting means;

Fig. 11 is a diagrammatic plan view illustrating the manner in which the opening for the air exhausting means is sealed off; and Fig. 12 is a view of an autoclave in which the final pressing or compositing operation may be carried out.

Figure 1:
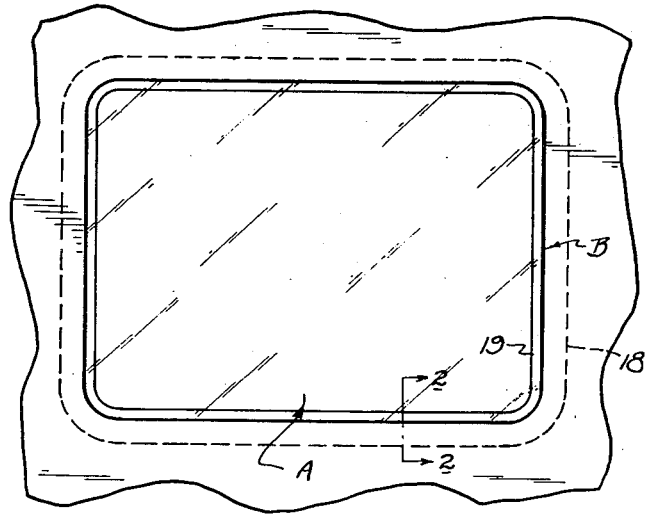
Fig. 1 is a fragmentary view of a portion of the fuselage of an airplane showing a sight opening and a so-called extended plastic type of laminated safety glass unit mounted in the opening.
Figure 2:
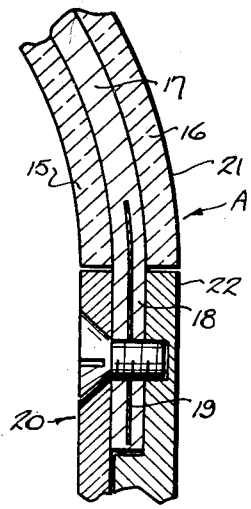
Fig. 2 is a fragmentary, vertical section taken substantially on the line 2—2 in Fig. 1.

Referring now more particularly to the drawings, there has been illustrated in Figs. 1 and 2 a laminated glass structure A of the extended plastic type, mounted in the sight opening B of an airplane. The structure A comprises two sheets of glass or other relatively hard transparent substance 15 and 16 and an interposed layer of a relatively soft and resilient plastic material 17. The plastic interlayer 17 is of greater area than the glass sheets and extends outwardly therebeyond as at 18 to provide a flexible attaching and sealing flange, which may be reinforced by a thin flexible metal collar or frame 19 embedded therein.

When a laminated transparent closure unit of this kind is clamped between opposing members of a frame 20 surrounding the sight opening B in the manner shown, a flush type window mounting will be had. That is, the outer surface 21 of the window will be flush with the outside wall or skin 22 of the ship and so will not interrupt nor interfere with the streamlining of the plane in any way. At the same time, because only the plastic flange of the window is securely anchored in place, the glass part of the unit will have a certain freedom of movement within the opening, and for that reason will be considerably less likely to break under the stresses, strains and pressure differentials encountered in flying.

Figure 3:
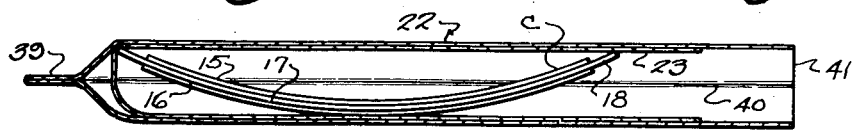
Fig. 3 is a longitudinal sectional view of one of the flexible containers, showing an assembled glass-plastic sandwich inserted therein.

In making a laminated safety glass unit of this character the various laminations are first assembled together in proper superimposed relationship to form a sandwich such as shown as C in Fig. 3. The outer sheets 15 and 16 may be of either sheet, plate or heat treated glass. Or one or both of them may be of a relatively hard type of transparent plastic such as Plexiglas, Lucite, etc. The interlayer 17 is preferably polyvinyl butyr acetal resin plasticized with 37½ parts of dibutyl sebacate per 100 parts of resin by weight, but different plastics of varying thickness and physical characteristics, chosen from the several classes of resins, cellulosic derivatives and the like may also be satisfactorily employed. However, when suitably plasticized polyvinyl acetal resins are used as the interlayer, it is unnecessary to employ an adhesive, because such resins will bond directly to cleaned glass sheets upon application of heat and pressure alone.

After the sandwich C has been assembled it is introduced into a flexible container, such as indicated by the numeral 22 in Fig. 3 and which is designed to protect the sandwich from direct contact with the autoclave fluid. In order to prevent squeezing out or deformation of the extended plastic during autoclaving it is sometimes desirable to wrap the sandwich, before putting it in the container 22, in a material such as heavy paper which has been treated to prevent its sticking to the plastic. Such a wrapping material has been indicated at 23.

Figure 4:
Fig. 4 is an enlarged, fragmentary, sectional view through the flexible container of Fig. 3, showing the construction of the sheeting from which it is made.
Figure 7:
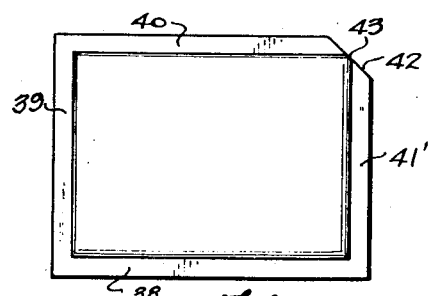
Fig. 7 is a plan view of the same container after its fourth side has been sealed shut and an opening made to receive the air exhausting means.

The container 22 is preferably made of cellophane sheeting coated with a flexible, thermosealing lacquer such as a cellulose nitrate lacquer. One form of such sheeting which has proven very efficient for the purpose is designated D in Fig. 4, and consists of two sheets of cellophane 24, coated on both sides with a flexible cellulose nitrate lacquer 25, and laminated together by a layer of cold setting adhesive 26. The cellulose nitrate lacquer, with which the cellophane is coated, is of a character that will seal to itself and also to the cellophane under heat and pressure, so that when the edges or marginal portions of two layers of the laminated sheeting D are placed together and subjected to heat and pressure, as shown in Fig. 4, a fluid tight joint will be formed between them.

A lacquer coated cellophane sheeting in thicknesses of approximately .0045 inch, when laminated in double thickness with a cold setting adhesive, has proved to be very satisfactory in actual commercial production. This laminated cellophane sheeting is received in rolls similar to ordinary forms of plastic sheeting.

Figure 5:
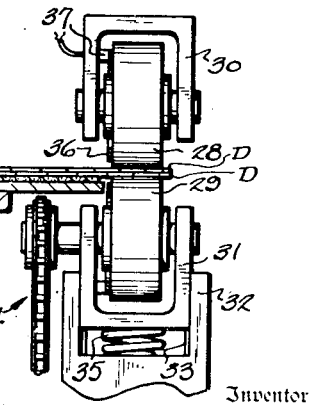
Fig. 5 is a view of one type of apparatus that may be used to seal the free edges of the flexible containers.

In making the containers 22, it is preferred to feed two layers of the sheeting, one on top of the other, from separate rolls (not shown) onto a conveyor 27 (Fig. 5). The conveyor carries the superimposed layers D—D of the sheeting along, and passes the marginal portions thereof between a pair of heated driven pressure rolls 28 and 29. As shown, the upper roll 28 is rotatably mounted in a fixed frame 30, while the lower roll is rotatably mounted in a yoke member 31, which is supported for vertical movement in a slide frame 32 provided with suitable guides 33.

The lower roll 29 is driven by a chain and sprocket drive 34 and the upper roll is driven by contact, being urged toward engagement with the lower roll by the compression spring 35. The rolls 28 and 29 are driven at the same speed as the conveyor 27, so that the edges of the sheeting D—D will feed smoothly through the rolls during the sealing operation. Heating of the rolls can be accomplished in any desired manner, for example by electrical resistance elements within the rolls themselves, which are supplied with current through a ring contacting element 36, movable with the rolls, and a fixed contact 37 in sliding engagement with the ring.

Figure 6:
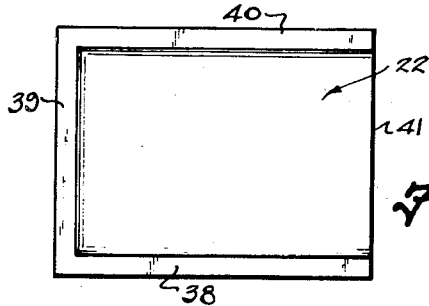
Fig. 6 is a plan view of one of the flexible containers, sealed on three sides.

A very satisfactory method of making the containers 22 is to provide another pair of sealing rolls, such as shown in Fig. 5, on the opposite side of the conveyor 27. In this way two different edges of the superimposed layers of sheeting D—D can be sealed up at the same time, as fast as the sheeting is fed off of the rolls; and a single long, tubular sheet is continuously formed from the two layers as they move between the sealing rolls. Thus tubular sheet can then be cut up into any desired lengths, and one free edge of each length sealed up to form a sort of bag, as shown in Figs. 3 and 6; that is, sealed on three sides as at 38, 39 and 40, and open at the end as at 41.

The container so formed is now ready to receive a glass-plastic sandwich in the manner shown in Fig. 3, after which the fourth side is sealed up in the same way as the other three, as at 41', to completely close the container (Fig.

7). The next step is to exhaust the air from the sealed bag and, in order to get the evacuating means into it, one corner of the container 22 is cut back as at 42 far enough to make an opening 43 into the interior.

One of the features of the invention is the way in which the air is exhausted from the container and the special apparatus that is provided for the purpose. Briefly stated, the avacuating apparatus comprises a tube for insertion into the container and through which the air is exhausted, and a clamp associated with the tube for closing the opening around it. As best shown in Figs. 8, 9 and 11, the tube is designated by the numeral 44 and is simply a long slender brass cylinder having an open and a closed end and provided with a plurality of small openings 45 in its side walls adjacent the closed end. The purpose of providing a number of openings in the side of the cylinder, rather than a single opening there, or in the end, is to remove the possibility of the apparatus being rendered ineffective by accidental blocking of one opening.

The opposite or open end of the tube 44 is in communication with a flexible hose 46, leading to a suitable air exhausting means, by a connection 47 provided with a shut-off valve 48. The clamping member of the evacuating means is shown most clearly in Fig. 10 and is designated in its entirety by the numeral 49. In construction it is very similar to a large paper clamp having a substantially U-shaped spring steel body portion 50, with the legs 51 and 52 of the U being constantly urged toward one another by the spring tension of the metal. The legs 51 and 52 thus form the jaws of the clamp and are lined on their inner sides with heavy pieces of rubber or other resilient material 53 and 54. Their outer ends are rolled back as at 55 and 56 to receive the bent ends 57 of the looped handle members 58 and 59. The handle members 58 and 59 extend outwardly beyond the rear of the body portion 50 to form levers which, when engaged and pressed by the hand of the operator, will force open the jaws 51 and 52 of the clamp.

The tube 44 is associated with the clamp member 49 by simply sliding it through an opening 60 in the rear side 61 of the body portion of the clamp, and also through a cylindrical channel 62 cut in the two rubber facing strips 53 and 54. This channel 62 is large enough to permit the tube 44 to slide therein, but is actually smaller than the diameter of the tube so that the space around it will be tightly sealed whenever the jaws of the clamp are closed.

To evacuate the container 22 the tube 44 is slipped into the opening 43 at the corner, and the jaws of the clamp 49 caused to grip the walls of the container, as shown in Figs. 8 and 9, to tightly seal the opening around the tube. The tube is then slid farther into the container until it is just about in contact with the edge of the sandwich C (Figs. 8 and 9), and the valve 48 is opened to cause the air to be sucked out of the cavity in the bag. The position of the tube 44 will insure all of the air being drawn out from between the laminations and that none will be trapped anywhere inside the container.

In connection with the complete exhausting of the air, the fact that the material of which the container is made is very thin (about .009 of an inch), and also the fact that it is transparent, are two very important points. In the first place the thin flexible nature of the container walls will permit it to conform exactly to the contour of the sandwich (see Fig. 9) when every bit of air has been drawn out. Consequently, by looking at the sandwich through the thin transparent cellophane sheeting, the operator can tell with certainty when all of the air has been exhausted, and in fact can actually see an increasing transparency or "clearing up" in the sandwich itself, which is the sign of adhesion between the laminations.

In other words, when the air is properly exhausted from the inside of the container the pressure of the outside air will compress the sandwich to an extent sufficient to give a preliminary bonding of the laminations, and no other prepressing operation is required with this method.

With the air exhausted from the container it then becomes necessary to remove the evacuating apparatus and to seal up the opening, without however losing the vacuum in the container. The ease with which this can be done is another important feature of the invention. First the tube 44 is slid backward to the position shown in Fig. 11, leaving the valve 48 still open, and without disturbing or releasing the clamp 49. Then, while still maintaining the vacuum on the bag cavity, the corner of the container is passed between the sealing rolls 28 and 29, as shown diagrammatically in Fig. 11, thus sealing off the bag cavity in front of the tube 44. The clamp 49 can then be removed and the tube slid entirely out of the container, whereupon the bagged unit is ready to be introduced into the autoclave shown in Fig. 12.

After evacuation and removal of the evacuating means, the light thin sheet of transparent cellophane will be skin tight on the sandwich so that the unit can be treated and handled in the same way as a prepressed and unprotected sandwich. Nevertheless, when evacuated and sealed as described above, the container will be completely oil-proof even at autoclaving temperatures. As a result, the sandwich, although protected from direct contact with the autoclave fluid, will at the same time have substantially the same advantages as an unprotected one so far as perfectly equalized pressure at all points, and quick heat transfer during the various temperature cycles employed, is concerned.

Another point is that the cellophane sheeting is so inexpensive comparatively speaking, that new containers can be "tailor made" for each unit and then put into salvage when the finished safety glass is removed therefrom.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In a method of producing laminated safety glass structures made up of alternate laminations of glass and plastic all bonded together into a unitary whole by the action of heat and pressure, the steps of assembling the laminations in proper superimposed relationship to form a sandwich, placing said sandwich between layers of thin, transparent and flexible thermosealing lacquer-coated plastic material, sealing the free edges of said plastic material to one another to form a fluid-tight container around the assembled laminations, inserting an evacuating implement through an opening formed in said fluid-tight container to a point closely adjacent said sandwich, clamping said sheet material around said implement to temporarily close said opening, applying sufficient suction to the interior of said container through said implement to evacuate the container and prepress the sandwich contained therein, partially withdrawing the evacuating implement while continuing the application of suction to the interior of said container, then sealing off the interior of the container between said sandwich and the partially withdrawn evacuating implement, and finally completely withdrawing the evacuating implement to leave an evacuated skin-tight container around said prepressed sandwich.

JAMES H. BOICEY.

REFERENCES CITED

The following references are of record in the file of this patent:

UNITED STATES PATENTS

| Number | Name | Date |
| --- | --- | --- |
| 1,740,989 | Lytle | Dec. 24, 1929 |
| 1,756,919 | Becker | Apr. 29, 1930 |
| 1,887,550 | Fix | Nov. 15, 1932 |
| 2,145,941 | Maxfield | Feb. 7, 1939 |
| 2,281,187 | Waters | Apr. 28, 1942 |
| 2,359,162 | Sherbondy | Sept. 26, 1944 |
| 2,374,040 | Ryan | Apr. 17, 1945 |
| 2,391,373 | Wickstrum | Dec. 18, 1945 |